Figure 8:
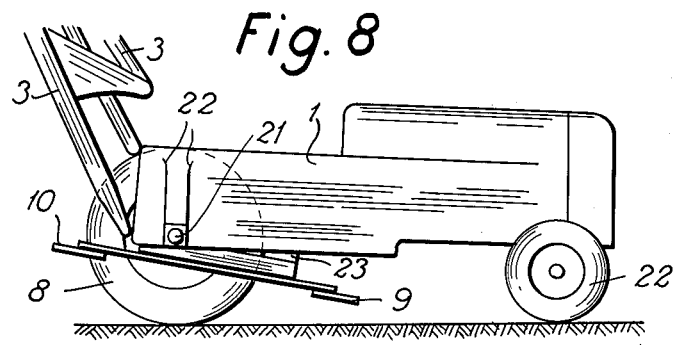

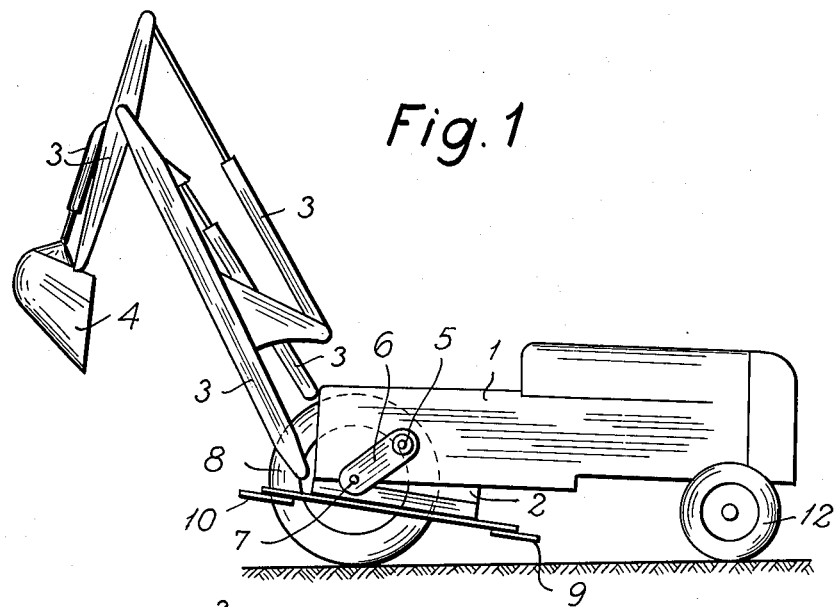
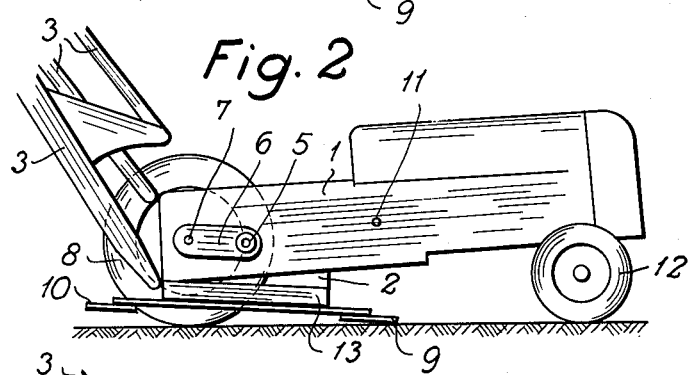
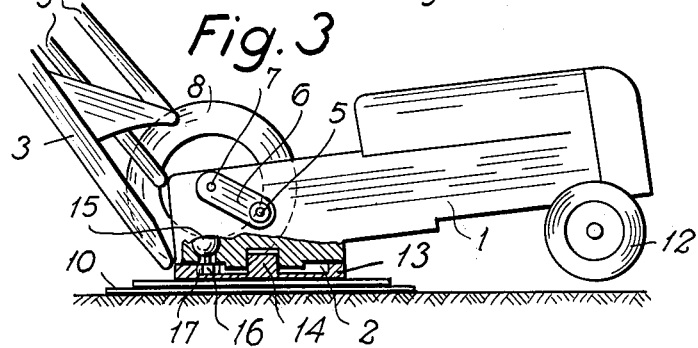

Feb. 15, 1966 A. MOUSTGAARD 3,235,280
ARRANGEMENT FOR TRACTORS
Filed June 5, 1964 5 Sheets-Sheet 2
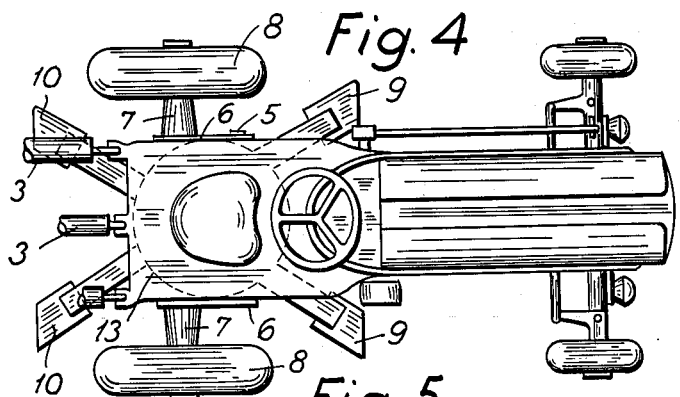
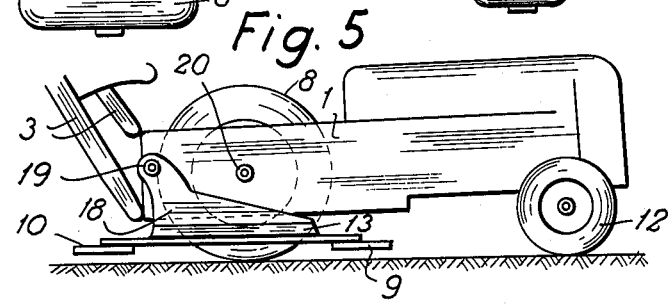
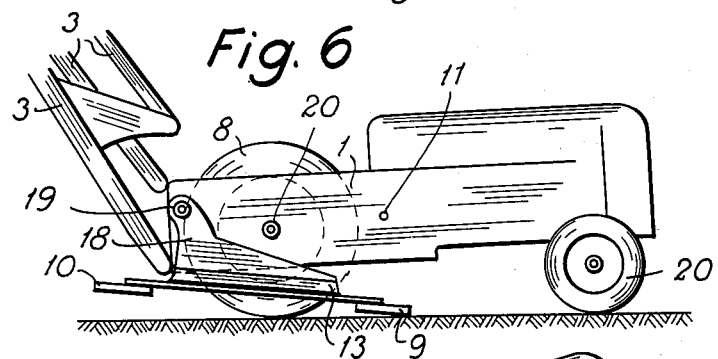
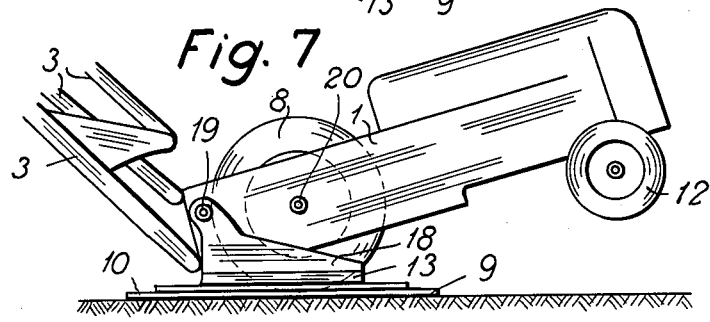

Feb. 15, 1966   A. MOUSTGAARD   3,235,280
ARRANGEMENT FOR TRACTORS
Filed June 5, 1964   5 Sheets-Sheet 3

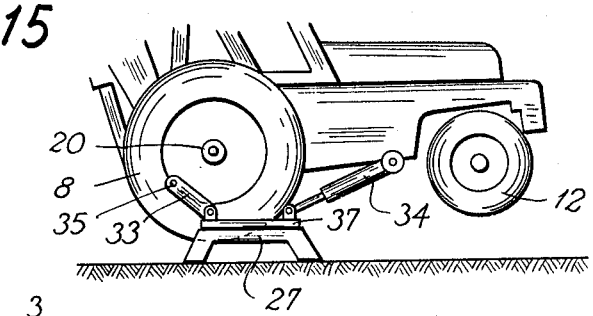
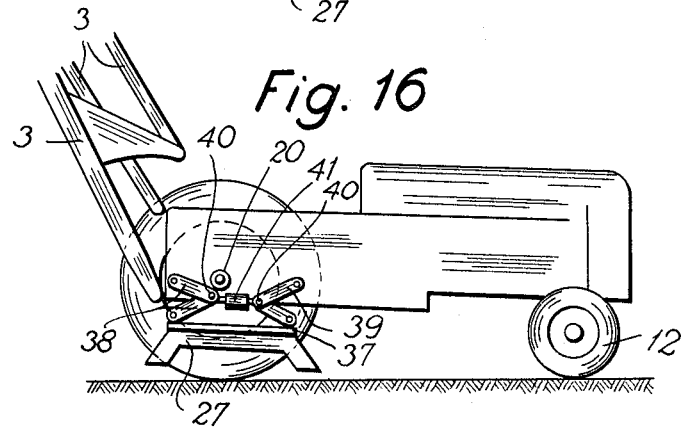
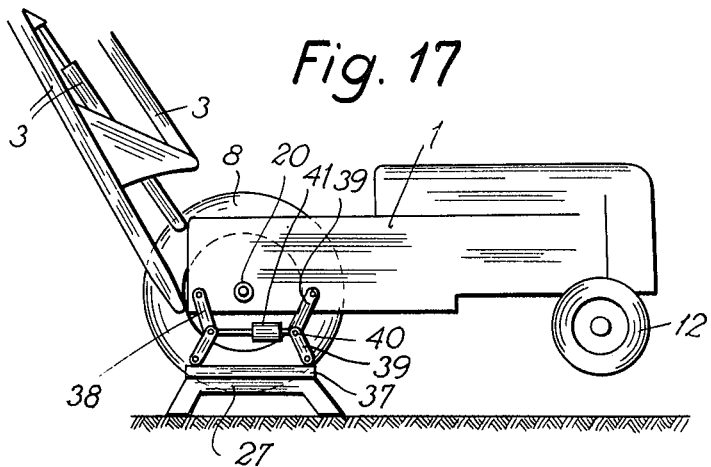

United States Patent Office 3,235,280
Patented Feb. 15, 1966

3,235,280
ARRANGEMENT FOR TRACTORS
Aage Moustgaard, Malmgatan 20, Helsinki, Finland
Filed June 5, 1964, Ser. No. 372,885
Claims priority, application Sweden, June 5, 1963,
6,220/63
15 Claims. (Cl. 280—43.24)

The present invention relates to an arrangement for tractors and has in particular for its object to provide an improved usefulness of working machines such as excavators, loaders, cranes, boring frames and the like combined with tractors.

These working machines are usually coupled to the rear part of the tractor and receive their driving power over suitable transmissions from the tractor motor. The tractor motor and the tractor front part are thus simultaneously constituting the counterweight necessary for stabilising the machine. The farther the working machine is turned aside in order to reach and act upon objects located beside the geometrical longitudinal axis of the tractor, the less will be the stabilising effect of the tractor front parts.

One object of the invention is to make it possible for the tractor, when raised in a position above the ground, to be turned in the horizontal plane corresponding to the angle by which the working machine mounted on the tractor has to be swung aside in order to perform the work involved. In this way the tractor front part may always be kept practically diametrically opposite the working position of the working machine and consequently exert its maximum stabilising effect at any time. For lifting the tractor use may be made of a carrying frame with a revolvable block which in the travelling position is suspended below the tractor chassis and in its working position may carry the tractor raised in such a position that the tractor wheels do not touch the ground.

There are, by the way, special known excavators which have a carrying frame disposed in a central position beneath the machine. The wheels of the latter are all mounted on swivel arms at the lifting of which the carrying frame together with the remaining parts of the machine are lowered to establish contact with the ground surface. The wheels are raised to such level that while the machine is being turned in a horizontal plane during its operation they are passed clear of the carrying frame. Lifting of the wheels requires a special lifting mechanism for the rear wheels and at least one lifting mechanism for the front wheels. When the machine is returned into its travelling position the whole machine has to be raised as soon as the wheels have established safe contact with the ground surface, an operation involving heavy demands on performance and dimensions of the lifting mechanism. In another special excavator the carrying frame, which is vertically displaceable below the machine, is lowered. The entire machine will then have to be raised into its working position as soon as the frame has established foothold, an operation involving the same heavy demands on performance and dimensions of the lifting mechanism.

The object of the invention is to reduce the demands in regard to performance and dimensions of the lifting mechanism and to provide a substantial simplification of the lifting devices, the lifting mechanism and the carrying frame being adapted in such manner that the said mechanism is at no time subjected to the full load of the machine. It is thereby possible to reduce its dimensions so substantially that an ordinary tractor of standard design may be equipped with a lifting mechanism so that in practice also tractors are enabled to turn about a vertical axis during their operation.

This is accomplished according to the invention thereby that the arrangement comprises operating elements by means of which the tractor rear wheels during turning of the tractor chassis, may be raised in relation to the carrying frame. During the interval the front wheels of the tractor are engaged with the surface, the chassis turns about the front wheel axle. The front part of the contact surface of the said frame is brought into contact with the ground prior to the remaining parts of the frame, the said contact taking place in front of the geometric vertical through the centre of gravity of the tractor so that the tractor will tilt about the front part of the contact surface and be brought to rest fully on the carrying frame, the tractor front wheels being on the tilting movement swung clear of their contact with the ground.

By the said tilting movement, which is characteristic of the invention, the result obtained is that, although the lifting mechanism only operates at the rear wheels, all four wheels are raised, and the tilting movement may readily be adapted in such manner that the front wheels are lifted more than the rear wheels during this operation, which is desirable where the front wheels project beyond the area of the carrying frame.

In accordance with the invention the rear wheels of the tractor may be carried by swivel arms provided in the tractor chassis which is itself rigidly connected with the carrying frame. The front part of the contact surface of the carrying frame is in the travelling position of the tractor closer to the ground surface than are its remaining parts. Both swivel arms may be moved by a single operating element such as a hydraulic, longitudinally variable arm. On switching over to working position the said front part of the carrying frame will along its fore contact surface constitute a tilting axis for the tractor as soon as the said contact edge has reached the ground surface.

The swivel arms of the rear wheels may according to the invention be suspended so as to be pivotal independently of each other; thus, even though the tractor is not standing on a fully horizontal ground surface, it is possible to secure for the front part of the carrying frame a contact edge along the ground of sufficient length to tilt about.

Instead of providing the rear wheels on swivel arms, the carrying frame may according to the invention be pivotally supported on a horizontal pin provided in the chassis behind the geometric vertical through the rear wheel axis, the rear wheel bearings being at the same time immovably mounted in the chassis. When in that case the carrying frame is swung from the travelling position towards the ground into working position, its front contact edge may be passed into contact with the ground prior to all of its remaining parts, notwithstanding that all parts of the carrying frame are carried at the same level above the ground surface during travel. To ensure a maximum of clearance beneath the tractor while travelling, it is of advantage that all parts of the contact surface of the carrying frame are carried at equal level beneath the tractor in its travelling position.

Further, in accordance with the invention the bearings of the rear wheels may be upwardly and downwardly displaceable in the chassis which is rigidly connected with the carrying frame the contact surface of which has its front part suspended closer to the ground surface than its remaining parts. Also in this case the result obtained is that the tractor may be switched from travelling position to working position and conversely by a single, very simple operating element, that is, a vertically disposed hydraulic cylinder which may further be used as a revolving pin when the tractor is to be swung in a horizontal plane during its work.

Instead of making the rear wheel bearings vertically displaceable, the carrying frame may according to the invention be suspended at a variable level in the chassis, whereas the rear wheel bearings are mounted in fixed position in same. In this case it is also sufficient to use a single hydraulic lifting cylinder which, in addition, may serve as a revolving pin.

In accordance with the invention the carrying frame may be vertically displaceable in the chassis, but it may also be displaceable in guiding and supporting rails provided in the chassis and extending rearwards and obliquely downwards, which affords a very advantageous transmission of forces from the chassis to the carrying chassis, whereby the latter and its operating elements may be of simple and light design.

These advantages are also obtained if in accordance with the invention the carrying frame is suspended at its front edge and at its rear edge in two sets of articulate bars beneath the chassis, which bars may be swung into working position by telescopic extension of one set of said bars, or at least one set of the said bars may in accordance with the invention consist of toggle joint bars, the articulated bars being then forced into working position by straightening the toggle joints. This may be performed by means of a single hydraulic, longitudinally variable cylinder which in accordance with the invention may be driven by the tractor motor.

In accordance with the invention such part of the carrying frame as is connected as indicated with the remaining parts of the tractor may be a revolvable block, which in its working position may be rotated by a separate motor in a horizontal plane on that part of the frame which is carrying the contact surface of the latter. The carrying frame thus incorporates a heavy bearing with a vertical axis about which bearing the motor is capable of rotating the tractor like a merry-go-round by means of suitable driving means engaging the lower stationary part of the carrying frame.

The said motor may according to the invention be hydraulic and be coupled to the hydraulic system of the tractor, which gives a very simple embodiment of the motor and its appertaining transmission devices.

The carrying frame may furthermore according to the invention be a carrying plate pivotally suspended at its front in heavy bearings and adapted so as to be the first of all parts of the frame to establish contact with the ground surface, whereby tilting of the tractor into working position will take place about the said bearings. This carrying plate will always ensure tilting, also when the tractor is stationed on marshy or other soft ground.

The carrying frame may further according to the invention be adapted to carry at its front part readily detachable and exchangeable road-making devices of a kind known per se as, for example, graders, vibrators or road rollers which will thereby be located at their appropriate place beneath the tractor.

Finally, the carrying plate itself may according to the invention be readily exchangeable and its bearings may be so adapted that the various devices for road making may be arranged in it.

The drawing shows schematically various embodiments of the arrangement in accordance with the invention.

Figure 9:
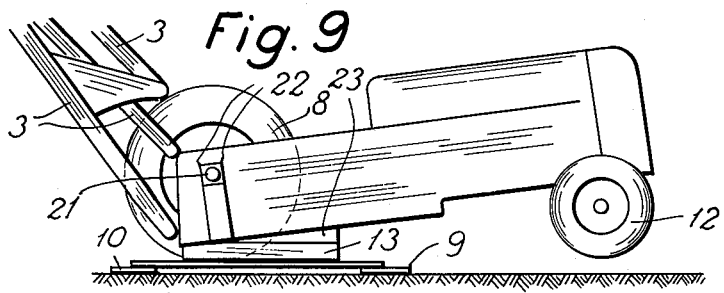
Figure 10:
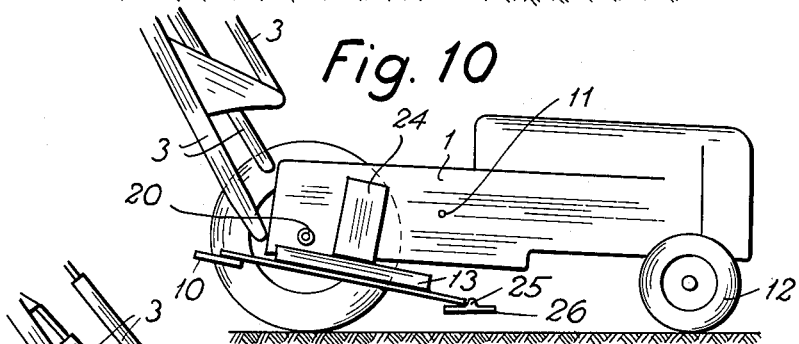
Figure 11:
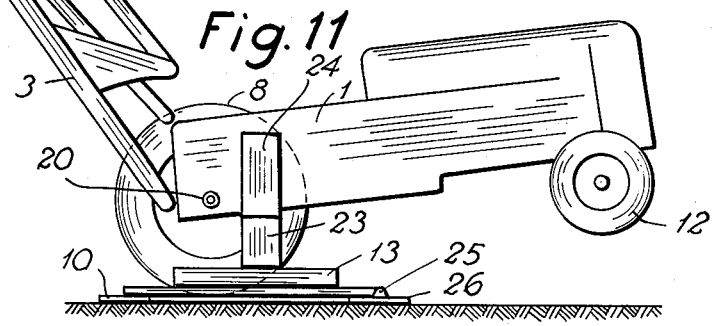
Figure 12:
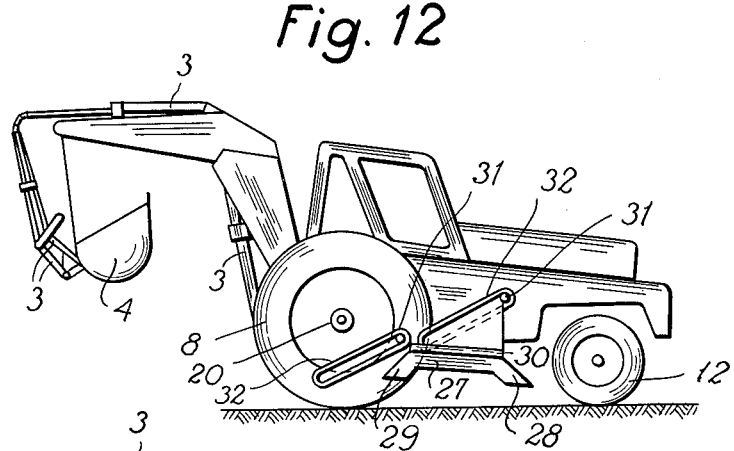
Figure 13:
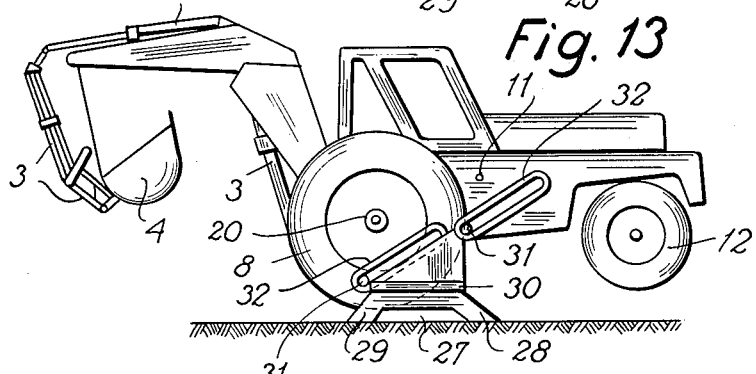
Figure 14:
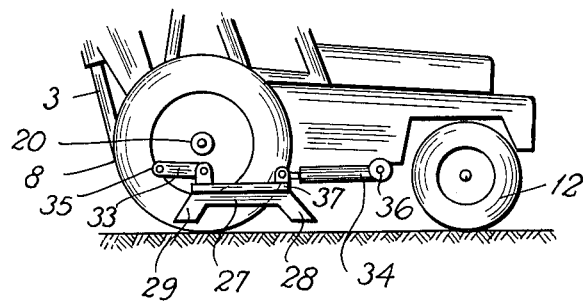

FIGURE 1 is a side view of a tractor with rear wheels suspended in swivel arms, all of it in the travelling position of the tractor, FIGURE 2 is the same, with swivel arms and rear wheels in an intermediate position, FIGURE 3 is the same, shown in working position, FIGURE 4 is a top view of same, FIGURE 5 shows another tractor with a pivotal carrying frame, all of it in the travelling position, FIGURE 6 is the same, shown in the intermediate position, FIGURE 7 is the same, shown in working position, FIGURE 8 shows a third tractor with its rear wheels supported in vertical guides, all of it in the travelling position, FIGURE 9 is the same in working position, FIGURE 10 is a fourth tractor with vertically displaceable carrying frame, all of it in travelling position, FIGURE 11 is the same in working position, FIGURE 12 shows a fifth tractor with a carrying frame supported in oblique guiding devices, all of it in the travelling position, FIGURE 13 is the same in working position, FIGURE 14 shows a sixth tractor with a carrying frame suspended in swivel arms, all of it in travelling position, FIGURE 15 is the same in working position, FIGURE 16 shows a seventh tractor the carrying frame of which is suspended by means of toggle joint bars, all of it in travelling position, and FIGURE 17 the same in working position.

To the chassis 1 of the tractor shown in FIGURE 1 is attached a carrying frame 2 and carrying and guiding arms 3 for a digging shovel 4.

Fixed bearings 5 provided in the chassis 1 carry swivel arms 6 supporting bearings 7 for the rear wheels 8 of the tractor.

As will appear from FIGURE 1 the feet 9 and 10 of the carrying frame are kept raised above the ground surface in such manner, however, that the rear feet 10 are kept at a higher level than the feet 9.

When the tractor has been driven to the place of work, the arms 6 are raised by a hydraulic lifting cylinder, hydraulic levers, hydraulic motor or the like (not shown) which, for example, may be driven from the hydraulic system of the tractor, whereby the feet 9 as shown in FIGURE 2 will contact the ground prior to the feet 10. At the continued lifting of the arms 6 towards the position indicated in FIGURE 3 the tractor will tilt about the front edge of the feet 9 because the centre of gravity 11 of the tractor is located behind same. At the tilting the front wheels 12 of the tractor are raised from the ground and the tractor is now resting on its feet 9 and 10 and is ready to start digging or other work for which its exchangeable working gear 3 and 4 is suitable. During this work the tractor is capable of turning about a vertical pin 14, the feet 9 and 10 being provided on a member 13 which is pivotal in relation to the upper part 2 of the carrying frame, the said part 2 having the form of a revolvable block with a gear wheel 16 which is driven by a hydraulic motor 15 and cooperates with an inside toothed rim 17 provided on the member 13. The motor 15 may be driven by the ordinary hydraulic system of the tractor, whereby the tractor will revolve as a merry-go-round on its stationary feet 9 and 10.

If the tractor shown in FIGURES 1 to 3 is to be returned into the travelling position indicated in FIGURE 1, the arms 6 are lowered again, whereby the rear wheels 8 will again touch the ground and tilt the tractor on to its front wheels again as shown in FIGURE 2, and the turning movement of the arms 6 will only cease when they have reached the position indicated in FIGURE 1, in which the feet are again raised from the ground surface.

As will appear from FIGURE 4, the tractor has two feet 9 forwardly and two feet 10 rearwardly and the wheels 8 are spaced so widely apart that when the tractor is turned about the pivot 14 indicated in FIGURE 3 they will pass clear of the part 13.

Instead of being provided with pivotal rear wheels, the tractor shown in FIGURES 5–7 has a carrying frame 18 capable of swiveling in bearings 19 provided in the chassis 1. In this case the rear wheels 8 have stationary bearings 20.

The carrying frame 18 is swivelled by means of a hydraulic cylinder, hydraulic lifting arm, hydraulic motor or the like (not shown), and when the front feet 9 have reached the ground as shown in FIGURE 6, the tractor will at the continued turning of the carrying frame tilt into the working position shown in FIGURE 7. Also this carrying frame 18 has a lower pivotal part 13 about which the whole tractor is capable of turning in its working position like a merry-go-round as illustrated in FIGURE 7.

The rear wheels 8 of the tractor shown in FIGURES 8 and 9 have bearings 21 which are displaceable in vertical guide rails 22 so that the chassis of the tractor and the carrying frame 23 rigidly connected therewith may be lowered towards the ground. As soon as the feet 9 touch the ground, the tractor will at the continued lifting of the wheels 8 tilt into the working position shown in FIGURE 9, in which the wheels 12 have been lifted above the ground and the tractor is capable of revolving like a merry-go-round about the stationary part 13 of the carrying frame resting on the feet 9 and 10. The bearings 21 may be displaced in the guide rails 22 by means of a hydraulic cylinder, hydraulic motor or the like (not shown).

In the tractor shown in FIGURES 10 and 11 the bearings 20 of the rear wheels 8 are permanently arranged in the chassis 1, whereas the carrying frame 13 is vertically displaceable beneath the chassis 1, the latter having a hydraulic cylinder 24 for engaging a piston 23 provided on the carrying frame 13. In the working position (see FIG. 11), the chassis 1 may swing freely with the cylinder 24 about the piston 23 on which the chassis 1 is then wedged into position when it has reached the desired working position.

In this tractor the feet 9 are substituted by feet 26 which are capable of swinging freely about horizontal pivots 25. The said feet may be convienient for use in marshy or other soft areas because on touching the ground they will at once establish contact with the ground surface along their entire surface of contact and the tractor will then tilt about the pivots 25 instead of about the front edge of the feet. The specific pressure exerted against the ground at the tilting movement proper will therefore be substantially less than in the case of the aforesaid tractors and there will be no risk of the tractor sinking down by one of its feet 26. The said risk may be further diminished by substituting both of the feet by a single carrying plate extending transversely beneath the tractor and suspended in the pivots 25. The same danger is averted on returning the tractor to the travelling position indicated in FIGURE 10.

The tractor shown in FIGURES 12 and 13 has also carrying and guiding devices 3 for a digging shovel 4. Furthermore, the tractor has between its wheels 12 and 8 a carrying frame the front legs 28 of which are closer to the road surface than the rear legs 29. The frame 27 carries a revolving block 30 which is suspended by means of pivots 31 in two pairs of guiding and supporting rails extending rearwardly and oblique downward. When the carrying frame by means of a hydraulic cylinder, hydraulic levers, hydraulic motor or the like (not shown) is passed down from the travelling position shown in FIGURE 12 towards the working position shown in FIGURE 13, it will at first contact the ground by its front legs 28, whereby the tractor will tilt rearwards about its centre of gravity 11 which is located behind the front edge of the front legs 28, and at the continued movement the tractor will be raised into the working position indicated in FIGURE 13.

FIGURES 14 and 15 show a similar tractor with a carrying frame 27, but this is suspended in arms 33 and 34 attached by means of pivots 35 and 36 to the tractor chassis, and the arms 34 are formed as hydraulic cylinders so that they are longitudinally variable. Also in this case the front legs 28 are, in the travelling position of the tractor, closer to the ground surface than the rear legs 29 (see FIGURE 14) so that the front legs 28 will be the first to touch the ground when the arms 34 are extended. As a result the tractor will at its continued movement tilt about the front edge of the front legs 28, whereby the front wheels 12 are lifted. Also the rear wheels 8 will now be lifted until the tractor is in the working posiiton shown in FIGURE 15 in which it is capable of revolving on the carrying frame 27 by means of a revolvable block 37 to which the rods 33 and 34 are connected. The said block 37 is connected with the frame 27 by means of a mechanism of similar kind as that shown in FIGURE 3.

Finally, FIGURES 16 and 17 show a tractor with its carrying frame 27 and revolvable block 37 connected with the tractor chassis by means of two pairs of toggle joint bars 38 and 39. Their toggle joints 40 are connected with each other by means of an arm which is longitudinally variable by means of its built-in hydraulic cylinder 41 which may be driven from the hydraulic system of the tractor, the said system, again, being as known driven by the tractor motor (not shown).

The arrangement according to the invention may be formed in various manner other than shown without departing from the scope of the invention.

What I claim and desire to secure by Letters Patent is:

1. A tractor comprising at least one front wheel and one rear wheel; a chassis mounted on said front and rear wheels; motive means for propelling said tractor; a carrying frame pivotally secured to and suspended from and beneath said chassis for engaging a surface upon which said tractor is operated, said carrying frame extending forwardly of said rear wheel and engaging said operating surface at a point forward of an axis extending vertically relative to said chassis and through the center of gravity of said tractor; operative means interconnecting said chassis and carrying frame for tilting said tractor about said forward portion of said carrying frame and supporting said tractor solely on said carrying frame.

2. An apparatus as defined in claim 1 wherein said carrying frame is rotatively secured to said chassis and including further means for rotating said chassis relative to said carrying frame whereby said tractor is revolved.

3. An arrangement as claimed in claim 1, characterised in that the bearings of the rear wheels are upwardly and downwardly displaceable in the chassis which is rigidly connected with the carrying frame the contact surface of which in the travelling position has its front part suspended closer to the ground surface than its remaining parts.

4. An arrangement as claimed in claim 1, characterised in that the tractor rear wheels are carried by swivel arms provided in the tractor chassis which is itself rigidly connected with the carrying frame, the contact surface of the said frame having in the travelling position of the tractor its front part closer to the ground surface than its remaining parts.

5. An arrangement as claimed in claim 4, characterised in that the swivel arms of the rear wheels are pivotable independently of each other.

6. An arrangement as claimed in claim 5, characterised in that each of the swivel arms of the rear wheels is pivotable between two positons in which the swivel arm in the travelling position of the tractor is turned into a position in which it is located as much below a horizontal intermediate position as it is located above the said position when in its working position.

7. An arrangement as claimed in claim 1, characterised in that the carrying frame is upwardly and downwardly displaceable in the chassis, whereas the bearings of the rear wheels are mounted in fixed position in same.

8. An arrangement as claimed in claim 7, characterised in that the carrying frame is vertically displaceable in the chassis.

9. An arrangement as claimed in claim 7, characterised in that the carrying frame is displaceable in guiding and supporting rails provided in the chassis and extending obliquely rearwards and downwards.

10. An arrangement as claimed in claim 7, characterised in that the carrying frame is suspended at its front edge and at its rear edge beneath the chassis in two sets of articulated bars which may be swung down by telescopic extension of one set of the bars.

11. An arrangement as claimed in claim 7, characterised in that the carrying frame is suspended at its front edge and at its rear edge beneath the chassis in two sets of articulated bars of which at least one set consists of toggle joint bars, the said two sets of articulated bars being capable of being swung down into working position by straightening of the toggle joints.

12. An arrangement as claimed in claim 1, characterised in that the carrying frame is pivotally supported on a horizontal pin provided in the chassis behind the geometric vertical through the rear wheel axis, the rear wheel bearings being at the same time mounted in fixed position in the chassis.

13. An arrangement as claimed in claim 12, characterised in that the operative means includes operating elements that are movably connected with a hydraulic longitudinally variable arm operatively connected to and driven by said motive means for propelling said tractor.

14. An arrangement as claimed in claim 13, characterised in that such part of the carrying frame as is connected in the manner indicated with the other parts of the tractor is a revolvable block which in the working position may be moved by a separate motor in a horizontal plane on such part of the frame as carries the contact surface of the latter.

15. An arrangement as claimed in claim 14, characterised in that the carrying frame at its front part has a carrying plate pivotally suspended by means of heavy bearings, the said carrying plate being adapted to contact the ground prior to all other parts of the frame, whereby the tractor will be tilted into working position about the said bearings.

References Cited by the Examiner
UNITED STATES PATENTS

| | | | |
|---|---|---|---|
| 1,827,853 | 10/1931 | Nenna | 180—1 |
| 2,235,595 | 3/1941 | Stein | 180—1 |
| 2,915,132 | 12/1959 | Tramerye | 180—1 |
| 3,142,395 | 7/1964 | Pingon | 280—43 |

BENJAMIN HERSH, *Primary Examiner.*

W. A. MARCONTELL, *Examiner.*